United States Patent
Cutrignelli et al.

(10) Patent No.: US 10,373,037 B2
(45) Date of Patent: Aug. 6, 2019

(54) RFID TRANSPONDER, RFID TRANSPONDER ARRANGEMENT AND METHOD FOR COMMUNICATION BETWEEN AN RFID TRANSPONDER AND A READING DEVICE

(71) Applicant: ams AG, Unterpremstaetten (AT)

(72) Inventors: Giancarlo Cutrignelli, Graz (AT); Iztok Bratuz, Ankaran (SI); Anton Pletersek, Orehova Vas (SI); Alexander Hacker, Graz (AT); Giuliano Manzi, Graz (AT)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 15/573,127

(22) PCT Filed: Apr. 28, 2016

(86) PCT No.: PCT/EP2016/059515
§ 371 (c)(1),
(2) Date: Nov. 9, 2017

(87) PCT Pub. No.: WO2016/180645
PCT Pub. Date: Nov. 17, 2016

(65) Prior Publication Data
US 2018/0129924 A1 May 10, 2018

Related U.S. Application Data

(60) Provisional application No. 62/160,539, filed on May 12, 2015.

(30) Foreign Application Priority Data

Jun. 1, 2015 (EP) .................................... 15170095

(51) Int. Cl.
*G06K 19/07* (2006.01)
*G06K 19/077* (2006.01)

(52) U.S. Cl.
CPC ..... *G06K 19/0723* (2013.01); *G06K 19/0707* (2013.01); *G06K 19/0712* (2013.01);
(Continued)

(58) Field of Classification Search
None
See application file for complete search history.

(56) References Cited

U.S. PATENT DOCUMENTS 8,164,453 B2* 4/2012 Wang ................. G06K 17/0029
  235/375
9,514,323 B2* 12/2016 Mehring ............. G06F 21/6218
(Continued)

*Primary Examiner* — Carlos Garcia
(74) *Attorney, Agent, or Firm* — Fish & Richardson P.C.

(57) ABSTRACT

An RFID transponder (T) suitable for communication with a reading device (RD) and adapted to be connected to a monitored unit (MU) is provided. The RFID transponder (T) comprises a comparing unit (CU) adapted to and arranged to receive a status signal from the monitored unit (MU) and configured to compare a value of the status signal to at least one predefined reference value and a state machine circuit (STM) connected to the comparing unit (CU) and configured to determine, based on a result of the comparison, whether the value of the status signal lies outside a range of operation defined by the at least one reference value. The state machine circuit (STM) is further configured to indicate the reading device (RD) that the value of the status signal lies outside the range of operation if the value of the status signal lies outside the range of operation.

17 Claims, 2 Drawing Sheets

(52) U.S. Cl.
CPC ..... *G06K 19/0716* (2013.01); *G06K 19/0717* (2013.01); *G06K 19/07749* (2013.01)

(56) References Cited

U.S. PATENT DOCUMENTS

| | | |
|---|---|---|
| 2006/0238309 A1 | 10/2006 | Takatama |
| 2007/0285229 A1 | 12/2007 | Batra et al. |
| 2012/0004770 A1* | 1/2012 | Ooyen ................ G06F 19/3462 700/235 |
| 2018/0096330 A1* | 4/2018 | Hamilton ........... G06Q 20/4016 |

* cited by examiner

RFID TRANSPONDER, RFID TRANSPONDER ARRANGEMENT AND METHOD FOR COMMUNICATION BETWEEN AN RFID TRANSPONDER AND A READING DEVICE

BACKGROUND

The application relates to a radio-frequency identification, RFID, transponder, in particular to a near field communication, NFC, tag, to an RFID transponder arrangement, in particular an NFC tag arrangement and to a method for communication between an RFID transponder and a reading device, in particular between an NFC tag and a reading device equipped with an NFC module.

RFID transponders such as NFC tags, for example passive NFC tags, battery-assisted NFC tags, or interface NFC tags may for example be used with a battery-powered host device for example to simplify communication between the host device and an NFC reading device, for example an NFC phone. For example pairing of the host device or a component of the host device with the NFC reading device may be simplified. NFC technology is for example used to exchange in close proximity connection setup data, for example for Bluetooth, Bluetooth Smart, Wi-Fi, etc., without the need for the user to repeatedly insert keys, passwords or pin codes.

According to a common system configuration, the reading device may operate as a reader, which generates an RF field and initiates communication with the RFID transponder. The RFID transponder may commonly respond to the reading device independent of certain parameters, as for example a battery output voltage of the host device, an ambient temperature, an ambient pressure, an ambient humidity and so on. After the reading device receives for example pairing data from the RFID transponder, it may initiate a pairing routine via a Bluetooth module or a Wi-Fi module of the reading device. However, at this stage, an inconsistent condition can occur for example if a component of the host device, for example a Bluetooth module or a Wi-Fi module of the host device, is not powered due to low battery charge or does not operate due to another parameter lying outside a range of operation.

SUMMARY

According to the improved concept, a radio-frequency identification, RFID, transponder monitors a parameter that is measured or provided by a monitored unit. Based on the parameter, the RFID transponder decides either to respond normally to a request of a reading device if the parameter lies inside a range of operation or to indicate to the reading device that the parameter lies outside the range of operation.

Here and in the following, the term "RFID transponder" is used to denote passive RFID transponders or battery-assisted RFID transponders. In particular, the term may denote passive near field communication, NFC, tags or targets or battery-assisted NFC tags or targets.

According to the improved concept, an RFID transponder is provided. The RFID transponder is adapted for communication with a reading device and adapted to be connected to a monitored unit. The RFID transponder comprises a comparing unit adapted to and arranged to receive a status signal from the monitored unit, if the monitored unit is connected to the RFID transponder, and configured to compare a value of the status signal to at least one predefined reference value.

Furthermore, the RFID transponder comprises a state machine circuit connected to the comparing unit and configured to determine, based on a result of the comparison, whether the value of the status signal or a parameter represented by the status signal lies outside a range of operation. Therein, the range of operation is defined by the at least one reference value. The state machine circuit is further configured to indicate the reading device that the value of the status signal or the parameter lies outside the range of operation if the value of the status signal or the parameter lies outside the range of operation.

The reading device may for example be a portable electronic device equipped with an NFC module suitable for communicating with the RFID transponder and/or with other RFID transponders and/or NFC targets. For example, the reading device may be a NFC compatible telephone, smart phone, tablet computer or the like.

The RFID transponder may for example be associated with a host device or with a component of the host device, for example a microcontroller, a Bluetooth controller or a Wi-Fi controller of the host device. The monitored unit may or may not be comprised by the RFID transponder. The RFID transponder may also be comprised by or connected to the host device or the component of the host device. A possible connection of the monitored unit to the RFID transponder may be implemented hardwired or wireless.

According to some implementations of the RFID transponder, the status signal is received by the comparing unit frequently or continuously from the monitored unit, if the monitored unit is connected to the RFID transponder. In alternative implementations, the status signal is received by the comparing unit only at specific instances, for example during a startup of the RFID transponder, the host device, the component of the host device and/or the monitored unit.

According to some implementations of the RFID transponder, the value of the status signal lies outside the range of operation if it is greater than the at least one reference value. In other implementations of the RFID transponder, the value of the status signal lies outside the range of operation if it is smaller than the at least one reference value. According to other implementations of the RFID transponder, the value of the status signal lies outside the range of operation if it is greater than a predefined first reference value and/or smaller than a predefined second reference value. The first reference value may be smaller than the second reference value, or vice versa.

According to some implementations of the RFID transponder, the RFID transponder further comprises a front end circuit connected to the state machine circuit and an antenna connected to the front end circuit. The antenna is sensitive to radio-frequency, RF, fields, in particular to an RF field generated by the reading device for communication via RFID or NFC. The front end circuit is configured to receive and transmit communication data from and to the reading device, respectively via the antenna.

According to some implementations of the RFID transponder, the indicating to the reading device that the value of the status signal lies outside the range of operation is realized by modifying or adapting a communication between the RFID transponder and the reading device. To this end, a content of data to be transmitted to the reading device may be set, defined or determined by the state machine circuit. For example, no data may be transmitted to the reading device or supplementary data may be defined to be transmitted to reading device.

According to some implementations of the RFID transponder, the indicating that the value of status signal lies outside a range of operation includes defining a content of data to be transmitted to the reading device.

According to some implementations of the RFID transponder, the RFID transponder comprises a storage device. The at least one reference value is stored in the storage device. The at least one reference value may for example be adjustable, for example by the host device, the component of the host device and/or the state machine circuit.

According to some implementations of the RFID transponder, the at least one reference value depends on an ambient temperature.

According to some implementations of the RFID transponder, the at least one reference value depends on a characteristic of the host device or the component of the host device, for example on a characteristic of a battery of the host device or a battery of the component of the host device.

According to some implementations of the RFID transponder, the indicating that the value of the status signal lies outside the range of operation includes disabling a communication, in particular any communication, between the reading device and the transponder. In such implementations, the RFID transponder does not respond to any command or request sent by the reading device, if the value of the status signal lies outside the range of operation.

According to some implementations of the RFID transponder, the defining the content of data to be transmitted to the reading device includes generating status information based on the status signal and/or on the result of the comparison. The defining the content further includes including the status information into the content of data to be transmitted to the reading device.

In such implementations, the RFID transponder may for example provide the status information for being transmitted to the reading device. For example, only data corresponding to the status information and no other information may be transmitted to the reading device.

Alternatively, data corresponding to the status information may be provided as supplementary data for being transmitted to the reading device. In this case, also regular data may be transmitted to the reading device. The regular data may for example correspond to data to be transmitted to the reading device if the value of the status signal lies inside and not outside of the range of operation. The regular data may for example contain information about the host device or the component of the host device. For example, the regular data may contain pairing data and/or setup data required for the reading device in order to set up a connection to communicate with the host device or the component of the host device.

According to some implementations of the RFID transponder, the regular data are stored in the storage device.

According to some implementations of the RFID transponder, the RFID transponder comprises the storage device and the state machine circuit is configured to store the status information into the storage device, in particular if the value of the status signal lies outside the range of operation.

According to some implementations of the RFID transponder, the front end circuit is configured to read out the status information from the storage device for transmitting the data to be transmitted to the reading device. The front end circuit may also be configured to read out the regular data from the storage device for transmitting the data to be transmitted to the reading device.

According to some implementations of the RFID transponder, the state machine circuit is configured to read out the status information from the storage device and to supply the status information to the front end circuit for transmitting the data to be transmitted to the reading device. The state machine circuit may also be configured to read out the regular data from the storage device and to supply the regular data to the front end circuit for transmitting the data to be transmitted to the reading device.

According to some implementations of the RFID transponder, the storage device comprises at least one of a volatile memory, a non-volatile memory, a first-in-first-out, FIFO, storage element and a register element or is implemented as one of those.

According to some implementations of the RFID transponder, the RFID transponder is implemented as an NFC tag or NFC target, in particular as a passive NFC tag, a passive NFC target, a battery-assisted NFC tag or a battery-assisted NFC target.

According to some implementations, the status signal is given by a sensor signal representing a physical quantity. In such implementations, the monitored unit is implemented as a sensor or comprises a sensor. The sensor may for example be implemented as a temperature sensor, a pressure sensor, a humidity sensor or another sensor. Correspondingly, the physical quantity may correspond to a temperature, in particular an ambient temperature of the host device, a pressure, in particular an air pressure, a humidity, in particular a relative humidity of air, and so on. In such implementations, the range of operation may for example correspond to a specified or allowed range of operation, for example a specified or allowed temperature range of the host device or the component of the host device.

According to some implementations of the RFID transponder, the RFID transponder comprises the sensor.

In other implementations, the sensor is external to the RFID transponder. For example, the sensor may then be comprised by the host device, the component of the host device, by a further device or may be a stand-alone sensor.

According to some implementations of the RFID transponder, the state signal is given by an output voltage of a battery of the monitored unit and the at least one reference value corresponds to a minimum battery voltage. In such implementations, the status signal lies outside the range of operation if an absolute value of the output voltage of the battery is smaller than an absolute value of the minimum battery voltage.

According to some implementations of the RFID transponder, the RFID transponder is adapted to be connected to at least one further monitored unit. The comparing unit is adapted and arranged to receive at least one further status signal from the at least one further monitored unit and is configured to compare a value of the at least one further status signal to at least one predefined further reference value. The state machine circuit is configured to determine, based on a result of the comparison of the value of the further status signal to the at least one further reference value, whether the value of the further status signal lies outside a further range of operation defined by the at least one further reference value. The state machine circuit is configured to, if the value of the further status signal lies outside the further range of operation, indicate to the reading device that the value of the further status signal lies outside the further range of operation. All implementations of the RFID transponder described above may be readily adapted to obtain corresponding implementations of the RFID transponder, wherein the RFID transponder is adapted to be connected to the at least one further monitored unit.

According to the improved concept also an RFID transponder arrangement is provided. The RFID transponder arrangement comprises an RFID transponder according to the improved concept and the monitored unit. Therein, the monitored unit is implemented as a sensor comprised by the RFID transponder or as a sensor being external to the transponder.

In alternative implementations of the RFID transponder arrangement, the monitored unit comprises a sensor.

In alternative implementations of the RFID transponder arrangement, the monitored unit comprises a battery and the status signals given by an output voltage of the battery.

According to the improved concept, also a method for communication between an RFID transponder and the reading device is provided. The method comprises receiving a status signal from a monitored unit connected to and/or comprised by the transponder and comparing a value of the status signal to at least one predefined reference value. The method further comprises determining, based on a result of the comparison, whether the value of the status signal lies outside a range of operation defined by the at least one reference value and, if the value of the status signal lies outside the range of operation, indicating to the reading device that the value of the status signal lies outside range of operation.

According to some implementations of the method, the indicating that the value of the status signal lies outside the range of operation includes defining a content of data to be transmitted to the reading device.

According to some implementations of the method, the indicating that the value of the status signal lies outside the range of operation includes disabling a communication, in particular any communication, between the reading device and the RFID transponder.

Further implementations of the method follow readily from the various implementations and embodiments of the RFID transponder and the RFID transponder arrangement and vice versa.

BRIEF DESCRIPTION OF FIGURES

In the following, the RFID transponder and the corresponding arrangement are explained in detail with the aid of exemplary implementations by reference to the drawings. Components that are functionally identical or have an identical effect may be denoted by identical references. Identical components and/or components with identical effects may be described only with respect to the figure where they occur first; their description is not necessarily repeated in subsequent figures.

In the drawings.

DETAILED DESCRIPTION

Figure 1:
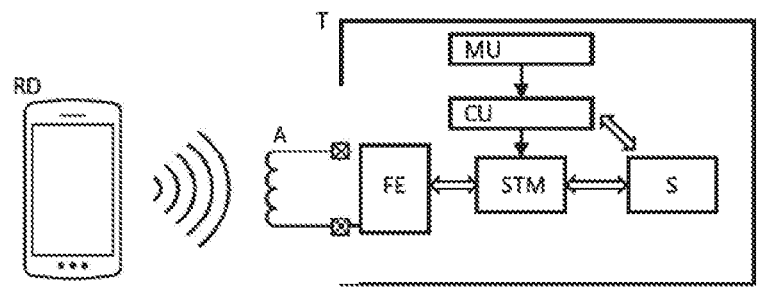
FIG. 1 shows an exemplary implementation of an RFID transponder arrangement according to the improved concept.

FIG. 1 shows an exemplary implementation of an RFID transponder arrangement according to the improved concept. The RFID transponder arrangement comprises an RFID transponder T. The RFID transponder T comprises an antenna A and a front end circuit FE connected to the antenna A. The transponder T further comprises a monitored unit MU, a comparing unit CU connected to the monitored unit MU, a state machine circuit STM connected to the comparing unit CU and to the front end circuit FE and a storage device S connected to the state machine circuit STM. Furthermore, a reading device RD is shown, which is not comprised by the RFID transponder arrangement.

The RFID transponder T is for example implemented as a passive or battery-assisted NFC tag. The reading device RD is for example a portable electronic device with an NFC module, the NFC module for example operating at a frequency of 13.56 MHz.

The monitored unit MU is for example implemented as an internal sensor of the RFID transponder T. The internal sensor is configured to measure a parameter, which may for example be a physical quantity, for example a temperature, a pressure, a humidity, a voltage, a current and so forth. The RFID transponder T is for example associated to a host device (not shown). That is, the RFID transponder T may be connected to, attached to or integrated within the host device. Consequently, the monitored unit MU may for example measure an ambient temperature, an ambient air pressure, an ambient air humidity or the like of the host device.

Depending on the parameter measured by the internal sensor, the monitored unit MU generates a status signal and supplies the status signal to the comparing unit CU. Consequently, the status signal represents a value of the measured parameter. The comparing unit CU compares a value of the status signal to at least one predefined reference value. For example, the comparing unit CU may compare the value of the status signal to a predefined first reference value. The comparing unit CU then determines whether the value of the status signal lies within or outside a range of operation defined for example by the first reference value. For example, if the value of the status signal is smaller than the first reference value, it may lie outside the range of operation and if the value of the status signal is larger than the first reference value, it may lie within the range of operation, or vice versa.

In some implementations of the RFID transponder, the comparing unit CU may additionally compare the value of the status signal to a predefined second reference value. The second reference value may for example be larger than the first reference value. Then, the range of operation may for example be defined by the first and the second reference value. For example, the value of the status signal may lie within the range of operation if it lies between the first and the second reference value and outside the range of operation otherwise, or vice versa.

The first and/or the second reference value may for example be stored in the storage device S. In particular, the first and/or the second reference value may be adjustable according to a specific implementation or application of the RFID transponder or the host device.

The reading device RD may for example send a request to the RFID transponder T by generating a respective RF field, as indicated in FIG. 1 by curve lines between the reading device RD and the antenna A. The RF field may for example feature a frequency of 13.56 MHz. The antenna A is sensitive to the RF field.

If the value of the status signal lies within the range of operation, the state machine circuit STM may for example enable a regular communication between the reading device RD and the RFID transponder T. When regular communication is enabled, the antenna A for example generates a request signal based on the request of the reading device RD, that is based on an RF field representing the request. The request signal is for example processed by the front end circuit FE. As a response, for example regular data may be read out by the front end circuit FE or by the state machine circuit STM from the storage device S. Then, the regular data may for example be transmitted to the reading device RD via the front end circuit FE and the antenna A.

The regular data may for example be stored on the storage device S in terms of an NFC message. The regular data may for example comprise data associated with the host device. The regular data may for example comprise authentication data, pairing data, setup data, keys, passwords, pin codes or the like of the host device for example of a Bluetooth controller, a Bluetooth Smart controller or a Wi-Fi controller of the host device.

If the value of the status signal lies outside the range of operation, the state machine circuit STM may disable a communication between the RFID transponder T and the reading device RD. If the communication is disabled, the RFID transponder T may for example not respond to the request of the reading device RD. In particular, the RFID transponder T may not respond to any request or command of the reading device RD including commands or requests corresponding to anti-collision processes. Consequently, single or multiple attempts of communication by the reading device RD may result in no response by the RFID transponder, if the value of the status signal is outside the range of operation.

In alternative implementations, the state machine circuit STM may not disable a communication between the RFID transponder T and the reading device RD if the value of the status signal lies outside the range of operation. Instead, the state machine circuit STM may generate status information based on the status signal and/or on the result of the comparison of the value of the status signal with the at least one reference signal. The status information may for example be stored in the storage device S by the state machine circuit STM. To this end, for example the content of the NFC message stored in the storage device S may be modified accordingly. Then, the NFC message including the status information and for example also including the regular data may be transmitted to the reading device RD as described above.

Consequently, the reading device RD is informed or notified about a status of the measured parameter by means of the modified NFC message.

Alternatively, the status information may also be dynamically created and transmitted to the reading device RD during regular communication between the RFID transponder and the reading device RD.

The comparing unit CU may also be connected to the storage device S. For example, the at least one reference value may be stored in the storage device S and may be read out by the comparing unit CU. Alternatively or in addition, reference data may be stored in the storage device S. Then, the comparing unit CU may read out the reference data and generate the at least one reference value based on the reference data.

The connection between the comparing unit CU and the storage device S is optional. In implementations, wherein the comparing unit CU is not connected to the storage device S, the at least one reference value may be stored in the comparing unit CU, in the state machine circuit STM or in another component of the RFID transponder.

Figure 2:
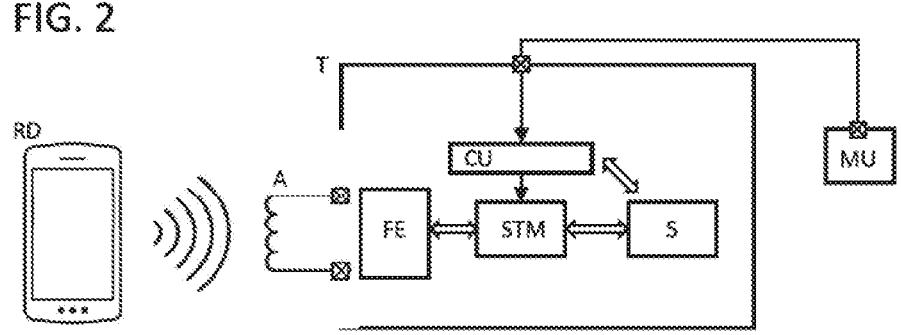
FIG. 2 shows a further exemplary implementation of an RFID transponder arrangement according to the improved concept.

FIG. 2 shows a further exemplary implementation of an RFID transponder arrangement according to the improved concept. The implementation of FIG. 2 is based on the implementation of FIG. 1.

In contrast to the implementation of FIG. 1, the monitored unit MU is not comprised by the RFID transponder T in the implementation of FIG. 2. The monitored unit MU is for example implemented as an external sensor. The external sensor is configured to measure a parameter, which may for example be a physical quantity, for example a temperature, a pressure, a humidity, a voltage, a current and so forth. The RFID transponder T is for example associated to a host device. That is, the RFID transponder T may be connected to, attached to or integrated within the host device.

Consequently, the monitored unit MU may for example measure an ambient temperature, an ambient air pressure, an ambient air humidity or the like of the host device. Depending on the parameter measured by the external sensor, the monitored unit MU generates the status signal and supplies the status signal to the comparing unit CU. In such implementations, what was said above for the implementation of FIG. 1 holds analogously for the implementation of FIG. 2.

Alternatively, the monitored unit MU may for example be a battery of the host device.

Figure 3:
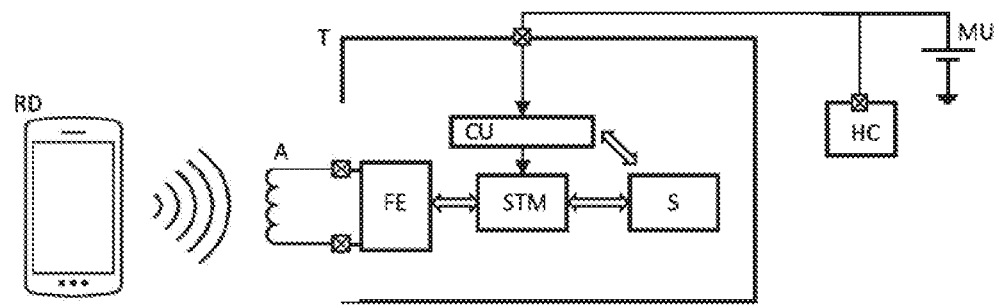
FIG. 3 shows a further exemplary implementation of an RFID transponder arrangement according to the improved concept.

FIG. 3 shows a further exemplary implementation of an RFID transponder arrangement according to the improved concept. The implementation of FIG. 3 is based on the implementation of FIG. 2.

In the implementation of FIG. 3, the monitored unit MU is implemented as a battery of the host device. Furthermore, a component HC of the host device, not being comprised by the RFID transponder arrangement, is connected to the comparing unit CU and the monitored unit MU, that is the battery of the host device. The component HC may for example be a Bluetooth controller, a Wi-Fi controller, a microcontroller and/or another component of the host device and may be supplied with power by the battery of the host device. The connection between the component HC and the RFID transponder may be a hardwired connection, a wireless connection or a remote connection. The component HC and the RFID transponder T may or may not be configured to communicate with each other. If they are configured to communicate with each other, the component HC may be configured so send a suspend signal to the RFID tag. The RFID tag may be configured to suspend itself when receiving the suspend signal.

The measured parameter corresponds for example to a battery voltage, in particular to an output voltage of the battery of the host device. In this case, also the status signal is given by the output voltage. The at least one reference value may then for example correspond to a specified minimum output voltage of the battery of the host device. The minimum output voltage may for example corresponds to a battery voltage below which the host device and/or the component HC does not or cannot operate and/or communicate with the reading device RD.

The minimum output voltage may for example correspond to a battery voltage below which the host device and/or the component HC suspends normal operations. The minimum output voltage may for example correspond to a predefined fraction of a nominal battery voltage. The fraction of the nominal battery voltage may for example lie in the between 5% and 30%, for example between 5% and 15%, for example at or approximately at 10%. However, an actual value of the minimum output voltage or the fraction of the nominal battery voltage may depend on the host device, the component HC, the type of the battery, an ambient condition, for example an ambient temperature or other factors.

The battery of the host device may for example supply the component HC and/or the host device with power. On the other hand, the RFID transponder T is for example not powered by the battery of the host device. Instead, the RFID transponder T may for example be powered by the RF field generated by the reading device RD. This may particular be the case if the RFID transponder T is implemented as a passive or a battery-assisted RFID transponder T. In case of a battery-assisted RFID transponder T, some functionalities of the RFID transponder T may be powered by an internal battery of the RFID transponder T. However, the internal battery is different from the battery of the host device.

Consequently, the RFID transponder T may be configured to monitor a level of the output voltage of the battery of the host device at any time said RF field is present.

In the implementation of FIG. 3, the comparing unit CU may for example be implemented as a voltage level detector. For further details on the voltage level detector, it is referred to FIG. 4.

Based on a result of the comparison of the value of the status signal with the at least one reference value, the RFID transponder T, in particular the state machine circuit STM may proceed as described with respect to FIGS. 1 and 2.

Figure 4:
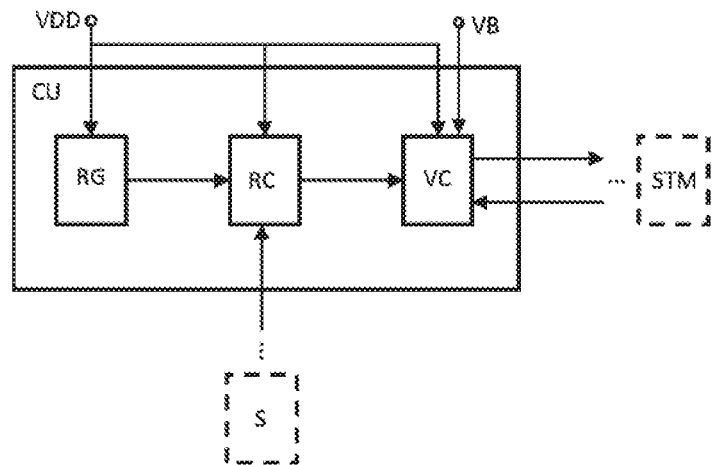
FIG. 4 shows an exemplary implementation of a comparing unit of an RFID transponder according to the improved concept.

FIG. 4 shows an exemplary implementation of a comparing unit of an RFID transponder according to the improved concept. The comparing units CU of FIGS. 1 to 3 may for example be implemented as shown in FIG. 4. In particular, the comparing unit shown in FIG. 4 may be used in an implementation of the RFID transponder arrangement, wherein the monitored unit MU is implemented as a battery of the host device and the status signal an output voltage VB of the battery of the host device, as for the implementation of FIG. 3.

The comparing unit CU of FIG. 4 is implemented as a voltage level detector. The comparing unit CU comprises a reference generator RG, a reference controller RC connected to the reference generator RG and a voltage comparator VC connected to the reference controller RC. The voltage comparator VC is also connected to the state machine circuit STM and the reference controller RC is connected also to the storage device S. The reference generator RG, the reference controller RC and the voltage comparator VC are connected to a supply voltage VDD. The supply voltage VDD is for example generated by means of the antenna A and/or the front end circuit FE of the RFID transponder T by harvesting energy from an RF field, in particular the RF field generated by the reading device RD. Furthermore, the voltage controller VC is supplied with the output voltage VB, that is the status signal in the shown case.

The output voltage VB may for example be subject to variations depending on temperature. The supply voltage VDD is for example independent of the output voltage VB, in particular may not be subject to variations depending on the temperature.

Battery information may be stored in the storage device S. The battery information may for example comprise information about a type of the battery of the host device. In particular, the battery information may comprise information about a minimum output voltage of the battery of the host device. The battery information may be configurable depending on the type of the battery of the host device. Alternatively or in addition, the battery information may comprise temperature response information, the temperature response information corresponding to a temperature performance of the battery of the host device.

The reference generator RG generates for example an initial reference voltage depending on the supply voltage VDD and supplies the initial reference voltage to the reference controller RC. The reference controller RC may read out the battery information from the storage device S. Depending on the initial reference voltage and the battery information, the reference controller RC may generate a secondary reference voltage and supply the secondary reference voltage to the voltage comparator VC. The at least one reference value is for example given by a value of the secondary reference voltage.

The voltage comparator VC compares the secondary reference voltage to the output voltage VB. In other words, the voltage comparator VC compares the at least one reference value to the value of the status signal. Then, the voltage comparator VC generates a result signal representing the result of the comparison and supplies it to the state machine circuit STM. Based on the result of the comparison, the state machine circuit STM proceeds as described with respect to FIGS. 1 to 3. When generating the result signal, the voltage comparator VC may for example employ an appropriate hysteresis to avoid multiple changes in the result signal, for example when the battery voltage VB and the secondary reference voltage are close to each other.

In case no suitable RF field is present for the energy harvesting and consequently for providing the supply voltage VDD, the voltage level detector and/or the voltage comparator VC may for example be in a standby mode. In this case, a supply current may for example be reduced to a leakage level and the result signal may not be generated.

Figure 5:
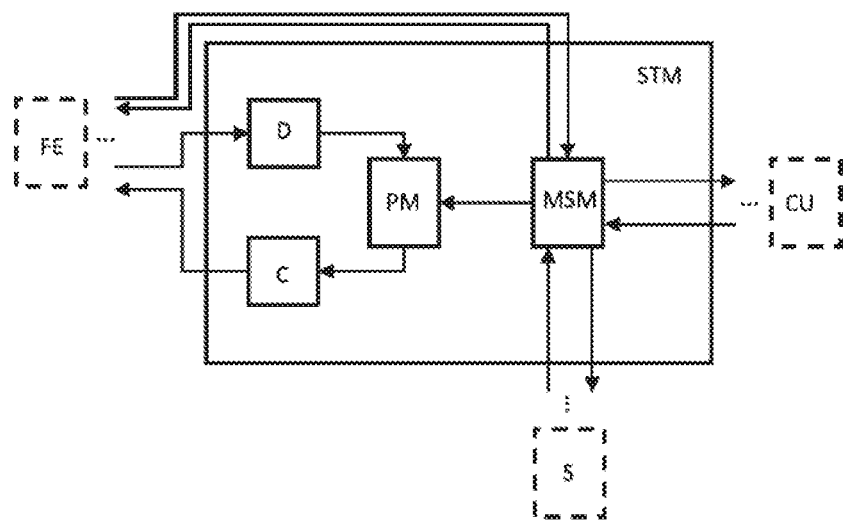
FIG. 5 shows an exemplary implementation of a state machine circuit of an RFID transponder according to the improved concept.

FIG. 5 shows an exemplary implementation of a state machine circuit of an RFID transponder according to the improved concept. The state machine circuit STM shown in FIGS. 1 to 4 may for example be implemented as shown in FIG. 5.

The state machine circuit STM comprises a main state machine MSM connected to the comparing unit CU, for example to the voltage controller VC, if applicable, to the storage device S and to the front end circuit FE. The state machine circuit STM further comprises a protocol manager circuit PM, for example implemented as an NFC RF protocol block, connected to the main state machine MSM. The state machine circuit STM also comprises a decoder circuit D connected to the protocol manager circuit PM and the front end circuit FE and a coder circuit C connected to the protocol manager PM and the front end circuit FE.

The protocol manager circuit PM, the decoder circuit D and the coder circuit C are adapted to execute commands and/or requests, in particular NFC commands, received by the RFID transponder T from the reading device RD. When an RF field generated for example by the reading device RD is detected by the antenna A and the front end circuit FE, respectively, the presence of the RF field may be detected and an RF detection signal may be generated by the front end circuit FE and supplied to the state machine circuit STM, in particular to the main state machine MSM. Based on the RF detection signal, the main state machine MSM may for example start an initialization process for example by reading data, for example the battery information, from the storage device S. Alternatively or in addition, the main state machine MSM may trigger an interrupt for example of the component HC of the host device in order to cause the component HC to initialize the storage device S, for example by storing the battery information or a part of the battery information into the storage device S.

Then, the main state machine MSM may for example send a measure signal to the comparing unit CU, for example to the voltage comparator VC, if applicable. In response to the measure signal, the comparing unit CU compares the value of the status signal to the at least one reference value as described with respect to FIGS. 1 to 4. After the comparing, the comparing unit CU may generate the result signal as described with respect to FIG. 4 and supply the result signal to the main state machine MSM. If the result signal indicates that the value of the status signal is outside the range of operation, the main state machine MSM indicates this to the reading device RD as described with respect to FIGS. 1 to 4, for example by disabling the communication or by generating an processing the status information as described above.

In implementations, where the state machine circuit STM and/or the main state machine MSM disables the communication if the value of the status signal is outside the range of operation, the main state machine MSM may for example generate an enable signal or a disable signal based on the result signal and supply the enable signal or disable signal to the protocol manager circuit PM. The protocol manager circuit PM may process the enable signal or disable signal and supply it to the coder circuit C. The coder circuit C may encode and/or modulate the enable signal or disable signal and supply the coded and/or modulated signals to the front end circuit FE, which may enable or disable its operation based on the coded and/or modulated signals.

The decoder circuit D is for example configured to receive and decode and/or demodulate signals based on incoming data, commands and/or requests from the reading device RD via the antenna A and the front end circuit FE. The decoder circuit D may further supply the decoded and/or demodulated signals to the protocol manager circuit PM for further processing.

By means of an RFID transponder, an RFID transponder arrangement and/or a method according to the improved concept, inconsistent conditions may be avoided. Therein, the inconsistent conditions may for example correspond to a situation, where the parameter represented by the status signal lies outside the range of operation and the reading device RD nevertheless tries to communicate with the host device or the component HC.

According to the improved concept, communication between the RFID transponder T and the reading device RD is for example disabled in case of inconsistent conditions. Consequently, the RFID transponder T does not respond to any request or command of the reading device RD. Hence, the reading device RD can also not communicate with the host device or the component HC. Alternatively, the reading device RD is notified by the RFID transponder T about the inconsistent conditions by means of the status information. In this case, the reading device RD may for example decide whether it establishes a communication with the host device or the component HC based on the status information.

In addition to the monitored unit MU, the RFID transponder T may for example comprise or be connected to one or more further monitored units. In this case, accordingly one or more further status signals are received from the one or more further monitored units by the comparing unit CU. Each of the one or more further status signal is then compared by the comparing unit CU to at least one further reference value defining a further range of operation. Consequently, the RFID transponder T may operate in the same or analog way as described with respect to FIGS. 1 to 5, wherein the case of the value of the status signal lying outside the range of operation may be extended to the at least one further status signal lying outside the at least one further range of operation.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the RFID transponder, the RFID transponder arrangement and corresponding method which are defined in the accompanying claims.

The invention claimed is:

1. An RFID transponder for communication with a reading device, the RFID transponder adapted to be connected to a monitored unit and comprising
   a comparing unit adapted and arranged to receive a status signal from the monitored unit and configured to compare a value of the status signal to at least one predefined reference value; and
   a state machine circuit connected to the comparing unit and configured to
   determine, based on a result of the comparison, whether the value of the status signal lies outside a range of operation defined by the at least one reference value; and,
   if the value of the status signal lies outside the range of operation, indicate to the reading device (RD) that the value of the status signal lies outside the range of operation;
   wherein the indicating that the value of the status signal lies outside the range of operation includes disabling a communication between the reading device and the RFID transponder.

2. The RFID transponder according to claim 1, further comprising a storage device, wherein the at least one reference value is stored in the storage device.

3. The RFID transponder according to claim 1, further comprising a storage device, wherein the state machine circuit is configured to store the status information into the storage device.

4. The RFID transponder according to claim 3, wherein the state machine circuit is configured to read out the status information from the storage device and to supply the status information to a front end circuit for transmitting the data to be transmitted to the reading device.

5. The RFID transponder according to claim 2 or 3, wherein the storage device comprises at least one of a volatile memory, a non-volatile memory, a first-in-first-out storage element and a register element.

6. The RFID transponder according to claim 1, implemented as a near field communication, NFC, tag or NFC target, in particular as a passive NFC tag, a passive NFC target, a battery-assisted NFC tag or a battery-assisted NFC target.

7. The RFID transponder according to claim 1, wherein the RFID transponder is associated with a host device or with a component of the host device and the at least one reference value depends on a characteristic of the host device or the component of the host device.

8. The RFID transponder according to claim 1, wherein the comparing unit is adapted to receive the status signal frequently or continuously from the monitored unit.

9. The RFID transponder according to claim 1, wherein the comparing unit is adapted to receive the status signal only during a startup of the RFID transponder and/or during a startup of the monitored unit.

10. The RFID transponder according to claim 1, wherein the RFID transponder is configured to transmit an NFC message to the reading device, the NFC message including the status information and regular data.

11. The RFID transponder according to claim 10, wherein the regular data contains pairing data, setup data and/or authentication data.

12. The RFID transponder according to claim 1, wherein the disabling the communication between the reading device and the RFID transponder includes not responding to any command or request sent by the reading device.

13. The RFID transponder according to claim 1, wherein the status signal is given by a sensor signal representing a physical quantity.

14. The RFID transponder according to claim 1, wherein the status signal is given by an output voltage of a battery of the monitored unit and the at least one reference value corresponds to a minimum battery voltage.

15. An RFID transponder arrangement comprising an RFID transponder according to claim 1 and the monitored unit, wherein the monitored unit is implemented as a sensor comprised by the transponder or as a sensor being external to the transponder.

16. A method for communication between an RFID transponder and a reading device, wherein the method comprises
receiving a status signal from a monitored unit connected to or comprised by the RFID transponder;
comparing a value of the status signal to at least one predefined reference value;
determining, based on a result of the comparison, whether the value of the status signal lies outside a range of operation defined by the at least one reference value; and,
if the value of the status signal lies outside the range of operation, indicating to the reading device that the value of the status signal lies outside the range of operation,
wherein the indicating that the value of the status signal lies outside the range of operation includes disabling a communication between the reading device and the RFID transponder.

17. The method according to claim 16, wherein the disabling the communication between the reading device and the RFID transponder includes not responding to any command or request sent by the reading device.

* * * * *